US012476409B2

(12) United States Patent
Ma et al.

(10) Patent No.: US 12,476,409 B2
(45) Date of Patent: Nov. 18, 2025

(54) CONNECTOR CAGE ASSEMBLY

(71) Applicant: Tyco Electronics (Shanghai) Co. Ltd., Shanghai (CN)

(72) Inventors: Yongfeng (Richard) Ma, Shanghai (CN); WenYu (Vindy) Liu, Shanghai (CN); Guangming (Suny) Zhao, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 568 days.

(21) Appl. No.: 17/876,693

(22) Filed: Jul. 29, 2022

(65) Prior Publication Data

US 2023/0029814 A1 Feb. 2, 2023

(30) Foreign Application Priority Data

Jul. 29, 2021 (CN) ......................... 202110867877.0

(51) Int. Cl.
*H01R 13/00* (2006.01)
*H01R 13/502* (2006.01)
*H01R 13/659* (2011.01)

(52) U.S. Cl.
CPC ....... *H01R 13/5025* (2013.01); *H01R 13/659* (2013.01)

(58) Field of Classification Search
CPC ................ H01R 13/629; H01R 13/659; H01R 13/5025; H01R 13/6594; H01R 12/716; H01R 12/77; H01R 12/91; H01R 13/428; H01R 3/627; H01R 13/6271; H01R 13/405; H01R 13/502; H01R 13/40;
(Continued)

(56) References Cited

U.S. PATENT DOCUMENTS 6,276,963 B1 * 8/2001 Avery .................. H01R 13/518 439/541.5
6,716,069 B2 * 4/2004 Nakamura et al. .......................... H01R 13/4365 439/752

(Continued)

FOREIGN PATENT DOCUMENTS

CN 205657255 U 10/2016
CN 110658590 A * 1/2020 ............... G02B 6/38

(Continued)

OTHER PUBLICATIONS

Chinese Office Action dated May 27, 2025 with English translation, corresponding to Application No. 2021108678770, 8 pages.

*Primary Examiner* — Rockshana D Chowdhury
(74) *Attorney, Agent, or Firm* — Barley Snyder

(57) ABSTRACT

A connector cage assembly includes a housing defining an upper port and a lower port stacked over each other in an up-down direction, an intermediate member between the upper port and the lower port in the up-down direction, and a movable stopper movably disposed on the intermediate member and movable between a first position and a second position in a front-rear direction perpendicular to the up-down direction. The movable stopper is at least partially located inside the intermediate member in the first position. The movable stopper at least partially extends beyond the intermediate member and limits a plug connector inserted into the lower port in the second position.

20 Claims, 5 Drawing Sheets

(58) Field of Classification Search
CPC ......... H01R 13/514; G06F 3/018; G06F 1/16; G06F 1/1635; G06F 1/1637; G06F 1/1662; G06F 1/1632; G06F 1/1654; H05K 1/181
USPC ............... 361/760, 728, 737, 752, 796, 800; 439/352, 489, 354, 357, 358, 488, 353, 439/752, 595, 603, 304
See application file for complete search history.

(56) References Cited

U.S. PATENT DOCUMENTS

| | | | | |
|---|---|---|---|---|
| 7,249,966 | B2 * | 7/2007 | Long | H01R 13/659 439/490 |
| 7,252,530 | B2 * | 8/2007 | Shamoto | H01R 13/641 439/352 |
| 7,261,591 | B2 * | 8/2007 | Korsunsky | H01R 12/727 439/541 |
| 7,377,824 | B2 * | 5/2008 | Mizutani et al. | H01R 13/501 439/752 |
| 7,534,123 | B2 * | 5/2009 | Koga | H01R 12/724 439/248 |
| 7,845,975 | B2 * | 12/2010 | Cheng | H01R 13/658 439/541.5 |
| 8,147,278 | B2 * | 4/2012 | Renteria et al. | H01R 13/66 439/620.15 |
| 8,162,675 | B2 * | 4/2012 | Regnier et al. | H01R 24/60 439/76 |
| 8,167,638 | B2 * | 5/2012 | Wojcik et al. | H01R 13/518 439/352 |
| 8,187,029 | B2 * | 5/2012 | Yu et al. | H01R 12/724 439/541.5 |
| 8,358,504 | B2 * | 1/2013 | McColloch | G02B 6/4269 398/135 |
| 8,876,561 | B2 * | 11/2014 | Endo et al. | H01R 12/721 439/752 |
| 9,312,643 | B2 * | 4/2016 | Jeon et al. | H01R 12/716 |
| 9,581,773 | B2 * | 2/2017 | Okabe | G02B 6/4261 |
| 9,673,570 | B2 * | 6/2017 | Briant et al. | H01R 13/659 439/296 |
| 9,728,919 | B1 * | 8/2017 | Dunwoody | H01R 13/6582 |
| 9,740,245 | B2 * | 8/2017 | Gault et al. | G06F 1/1662 |
| 9,877,413 | B2 * | 1/2018 | Regnier | G02B 6/4284 |
| 9,972,932 | B2 * | 5/2018 | Copper et al. | H01R 13/113 |
| 10,651,578 | B2 * | 5/2020 | Li et al. | H01R 12/7088 439/78 |
| 10,651,607 | B1 * | 5/2020 | Gawlowski | H01R 13/659 |
| 10,819,072 | B2 * | 10/2020 | Suda et al. | H01R 13/6594 439/607.01 |
| 10,939,594 | B2 * | 3/2021 | Long et al. | H05K 9/0009 |
| 11,011,861 | B1 * | 5/2021 | Briant | H01R 12/721 |
| 11,616,314 | B2 * | 3/2023 | Huang | H01R 12/7023 439/81 |
| 11,621,526 | B2 * | 4/2023 | Phillips | H01R 12/716 439/607.01 |
| 11,848,523 | B2 * | 12/2023 | Yang | H01R 13/6585 |
| 12,051,875 | B2 * | 7/2024 | Zhou | H01R 13/62961 |
| 12,266,889 | B2 * | 4/2025 | Bucher | H01R 13/533 |
| 2004/0062493 | A1 * | 4/2004 | Ishigami | G02B 6/4261 385/92 |
| 2006/0154524 | A1 * | 7/2006 | Huang et al. | H01R 12/707 439/607.01 |
| 2012/0264313 | A1 * | 10/2012 | Zhang et al. | H01R 13/52 439/131 |
| 2013/0171862 | A1 | 7/2013 | Chen et al. | |
| 2014/0335726 | A1 * | 11/2014 | Zhang | H01R 13/743 439/607.01 |
| 2017/0054234 | A1 * | 2/2017 | Kachlic | H01R 13/6583 |
| 2017/0264052 | A1 * | 9/2017 | Henry | H01R 13/6596 |
| 2019/0115677 | A1 * | 4/2019 | Kachlic | G02B 6/3879 |
| 2020/0059030 | A1 | 2/2020 | Duan et al. | |
| 2021/0296818 | A1 * | 9/2021 | Briant | H01R 13/6691 |
| 2022/0368082 | A1 * | 11/2022 | Phillips | H05K 7/20 |
| 2022/0384996 | A1 * | 12/2022 | Brunker et al. | H01R 13/659 439/78 |
| 2023/0411897 | A1 * | 12/2023 | Yang | H05K 7/2039 |

FOREIGN PATENT DOCUMENTS

| | | | | | |
|---|---|---|---|---|---|
| CN | 110797716 | A | * | 2/2020 | H01R 13/6585 |
| JP | 3008172 | B2 | * | 8/1997 | H01R 23/00 |
| JP | H09213426 | A | | 8/1997 | |
| JP | 2022160921 | A | * | 4/2021 | H01R 12/716 |
| WO | 2013031201 | A1 | | 3/2013 | |

* cited by examiner

CONNECTOR CAGE ASSEMBLY

CROSS-REFERENCE TO RELATED APPLICATIONS

This application claims the benefit of the filing date under 35 U.S.C. § 119(a)-(d) of Chinese Patent Application No. 202110867877.0, filed on Jul. 29, 2021.

FIELD OF THE INVENTION

Embodiments of the present disclosure relate generally to electrical connectors, and more particularly, to a connector cage assembly.

BACKGROUND

Existing laminated connector assemblies usually include a laminated connector cage assembly and a laminated connector body separately mounted. In specific applications, a connector is mounted to a circuit board via the connector body by SMT (Surface Mounted Technology), the cage assembly is then mounted to the circuit board by press fit, wherein the connector and the cage assembly are separate. During the assembly process of being mounted to the circuit board, an insertion limiting structure of a lower port of the cage assembly may interfere with the SMT type connector.

SUMMARY

A connector cage assembly includes a housing defining an upper port and a lower port stacked over each other in an up-down direction, an intermediate member between the upper port and the lower port in the up-down direction, and a movable stopper movably disposed on the intermediate member and movable between a first position and a second position in a front-rear direction perpendicular to the up-down direction. The movable stopper is at least partially located inside the intermediate member in the first position. The movable stopper at least partially extends beyond the intermediate member and limits a plug connector inserted into the lower port in the second position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
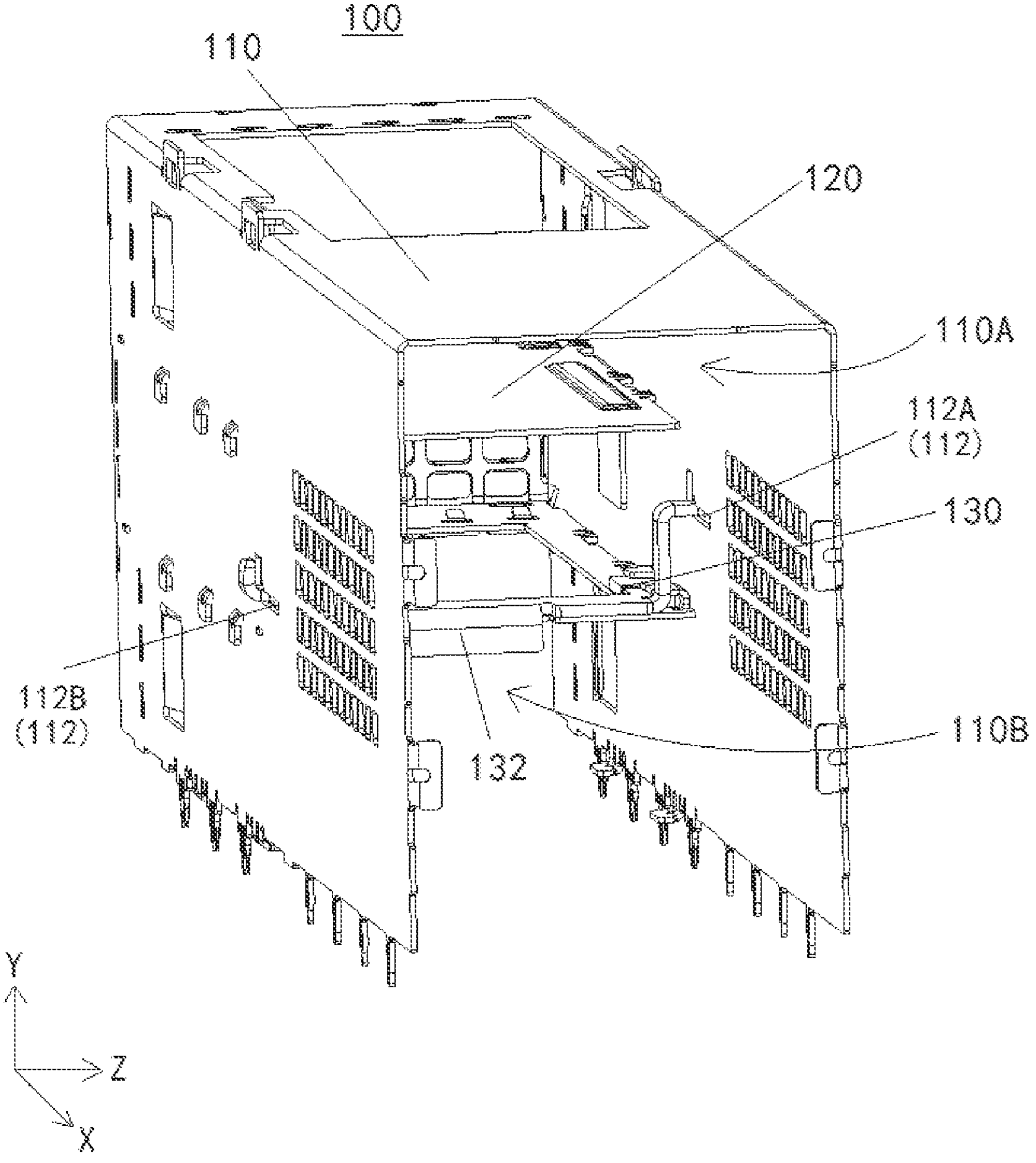
FIG. 1 is a perspective view of a connector cage assembly according to an embodiment.
Figure 2:
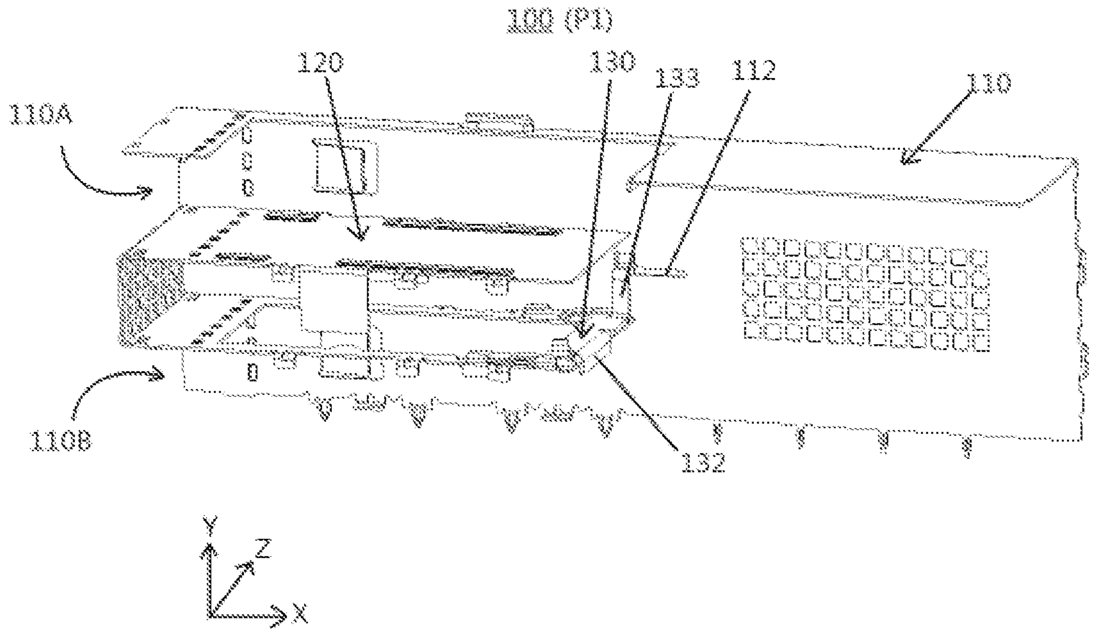
FIG. 2 is a sectional side view of the connector cage assembly of FIG. 1, showing an internal structure with a movable stopper in a first position.

Embodiments of the present disclosure will be described hereinafter in detail taken in conjunction with the accompanying drawings. In the description, the same or similar parts are indicated by the same or similar reference numerals. The description of each of the embodiments of the present disclosure hereinafter with reference to the accompanying drawings is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

In the illustrated exemplary embodiment, as shown in FIGS. 1-7, there is provided a connector cage assembly 100. The connector cage assembly 100 includes a housing 110 and an intermediate member 120. The housing 110 defines an upper port 110A and a lower port 110B stacked on each other in an up-down direction Y. The intermediate member 120 is provided between the upper port 110A and the lower port 110B in the up-down direction Y.

The connector cage assembly 100 further includes a movable stopper 130. The movable stopper 130 is movably provided on the intermediate member 120 and can move between a first position P1, shown in FIG. 2, and a second position P2, shown in FIG. 3, in a front-rear direction X perpendicular to the up-down direction Y. The movable stopper 130 is at least partially located inside the intermediate member 120 in the first position P1, and the movable stopper 130 at least partially extends beyond the intermediate member 120 and is configured to limit a plug connector 200 inserted into the lower port 110B in the second position P2.

It should be noted that, herein, in order to facilitate description, a direction in which the plug connector 200 is inserted into the ports 110A, 110B and pulled out from the ports 110A, 110B is defined as the front-rear direction X, a direction in which the upper port 110A and the lower port 110B of the housing 110 are stacked is defined as the up-down direction Y, and a direction perpendicular to both the front-rear direction X and the up-down direction Y as described above is defined as the left-right direction Z. It should be noted that, "at least partially" described herein means that the movable stopper 130 is entirely or partially located inside the intermediate piece 120 when the movable stopper 130 is located in the first position P1, and the whole or a part of the movable stopper 130 extends beyond the intermediate piece 120 when the movable stopper 130 is located in the second position P2.

According to the connector cage assembly 100 of the exemplary embodiments of the present disclosure, the movable stopper 130 limiting the plug connector 200 inserted into the lower port 110B is provided on the intermediate member 120. The movable stopper 130 can be switched between the first position in which the movable stopper 130 is located inside the intermediate piece 120 and the second position in which the movable stopper 130 is located outside the intermediate piece 120. The movable stopper 130 does not interfere with the assembling of the SMT type connector in the first position, and the movable stopper 130 can effectively limit the plug connector 200 in the second position, thereby solving the technical problem that the insertion limiting structure of the lower port of the existing laminated connector cage assembly may interfere with the assembling of the SMT type connector.

Figure 3:
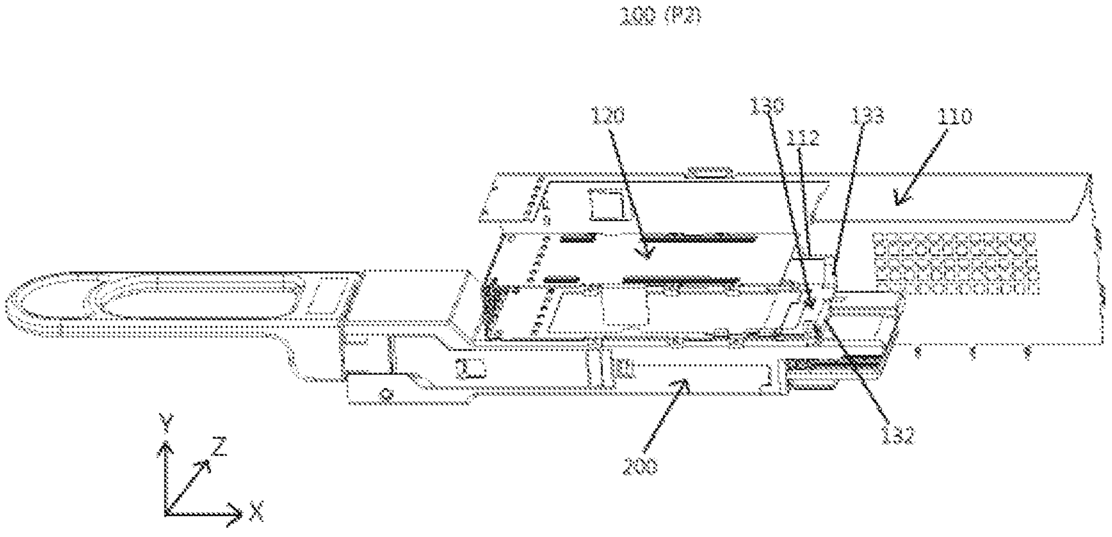
FIG. 3 is a sectional side view of the connector cage assembly of FIG. 1, showing the internal structure with the movable stopper in a second position.

In the illustrated exemplary embodiment, as shown in FIGS. 1-7, the movable stopper 130 includes a base 131 and a stopping portion 132. The stopping portion 132 extends from the base 131 and is bent from the base 131 into the lower port 110B for stopping the plug connector 200 inserted into the lower port 110B. As shown in FIG. 3, only the plug connector 200 inserted into the lower port 110B is shown and the plug connector 200 inserted into the lower port 110B is omitted in FIG. 3 for clarity. During the process of inserting the plug connector 200 into the lower port 110B, the movable stopper 130 is switched from the first position in which the movable stopper 130 is located inside the intermediate member 120 into the second position in which the movable stopper 130 is located outside the intermediate member 120, so as to realize the limiting function on the plug connector 200.

In the illustrated exemplary embodiment, as shown in FIGS. 1-7, the intermediate member 120 includes a supporting arm 121, and the movable stopper 130 further includes a sliding arm 134 extending from an end side of the base 131 in the left-right direction Z. The left-right direction Z herein is perpendicular to both the front-rear direction X and the up-down direction Y as described above. The sliding arm 134 is slidably supported on the supporting arm 121. In the connector cage assembly 100 of the exemplary embodiment of the present disclosure, the movable stopper 130 moves relative to the intermediate member 120 in a sliding manner to realize the switch of the movable stopper 130 between the first position and the second position.

In the illustrated exemplary embodiment, as shown in FIGS. 1-7, the intermediate member 120 includes two supporting arms 121 parallel to each other, the two supporting arms 121 extending in the front-rear direction X and spaced apart from each other in the left-right direction Z. The movable stopper 130 includes two sliding arms 134 parallel to each other and spaced apart from each other in the left-right direction Z, the two sliding arms 134 extending from a corresponding end side of the base 131 in the left-right direction Z, respectively. Each of the sliding arms 134 is slidably supported on a corresponding one of the supporting arms 121. The moving stability of the movable stopper 130 relative to the intermediate member 120 can be improved by adopting the symmetrical design of the above two pairs of supporting arms 121 and sliding arms 134, so as to more favorably realize the switch of the movable stopper 130 between the first position and the second position.

Further, in the illustrated exemplary embodiment, as shown in FIGS. 1-7, the supporting arm 121 has a surrounding portion 122 extending from one side of the supporting arm 121 and is bent toward another side of the supporting arm 121 opposite to the side. The surrounding portion 122 at least partially surrounds the sliding arm 134 slidably supported on the supporting arm 121. More specifically, a cross section of the surrounding portion 122 may be C-shaped. The support stability of the movable stopper 130 can be improved by adopting the design of the above surrounding portion 122, so as to more favorably realize the switch of the movable stopper 130 between the first position and the second position.

In the illustrated exemplary embodiment, as shown in FIGS. 1-7, one of the supporting arm 121 and the sliding arm 134 further includes a reinforcing rib 135, and the other of the supporting arm 121 and the sliding arm 134 further includes an abutting elastic piece 123. In the illustrated exemplary embodiment, the sliding arm 134 further includes the reinforcing rib 135, and the supporting arm 121 further includes the abutting elastic piece 123. Of course, in other embodiments not shown, the reinforcing rib may be formed on the supporting arm, and the abutting elastic piece 123 may be formed on the sliding arm, correspondingly. According to the present disclosure, the reinforcing rib 135 and the abutting elastic piece 123 are configured such that the abutting elastic piece 123 abuts against the reinforcing rib 135 to prevent the sliding arm 134 from sliding randomly relative to the supporting arm 121 when the movable stopper 130 is in the first position P1. It should be noted that the abutting cooperation between the reinforcing rib 135 and the abutting elastic piece 123 described herein is not designed to completely prevent the sliding arm 134 from sliding relative to the supporting arm 121, but is designed to prevent unintended and random sliding of the sliding arm 134 134 relative to the supporting arm 121 in the event of an accident or the like. During design, an abutting force between the reinforcing rib 135 and the abutting elastic piece 123 may be less than or equal to a preset value, for example, 5N. Therefore, when the plug connector 200 is inserted into the lower port 110B with a normal force, the insertion force for the plug connector 200 is generally greater than 5N, in this case, the insertion force for the plug connector 200 can overcome the abutting force between the reinforcing rib 135 and the abutting elastic piece 123, so as to successfully insert the plug connector 200 into the lower port 110B and force the movable stopper 130 to move from its first position P1 to its second position P2.

According to the connector cage assembly 100 of the exemplary embodiment of the present disclosure, the sliding resistance of the sliding arm 134 of the movable stopper 130 relative to the supporting arm 121 of the intermediate piece 120 is appropriately increased by the abutting cooperation between the abutting elastic piece 123 provided on the supporting arm 121 of the intermediate piece 120 and the reinforcing rib 135 formed on the sliding arm 134 of the movable stopper 130, thereby preventing the sliding arm 134 of the movable stopper 130 from sliding randomly relative to the supporting arm 121 of the intermediate piece 120.

In the illustrated exemplary embodiment, as shown in FIGS. 1-7, the movable stopper 130 further includes two connecting arms 133 extending from the corresponding end side of the base 131 in the left-right direction Z, respectively, and each of the connecting arms 133 is bent and then extends in the up-down direction Y, and is bent again at an end of the corresponding connecting arm 133 to form a connecting head 136. The housing 110 includes two connecting grooves 112 opened in two opposite side walls 111 of the housing 110, respectively. The connecting heads 136 of the two connecting arms 133 are slidably provided in the two connecting grooves 112, respectively.

In the shown embodiment, each of the connecting grooves 112 is L-shaped, a short-side groove portion of the L-shaped connecting groove 112 is adapted to assemble the connecting head 136 into the L-shaped connecting groove 112, and a long-side groove portion of the L-shaped connecting groove 112 is adapted to slide the connecting head 136 therein. That is, the movable stopper 130 is also slidably provided on the housing 110 by the connecting arm 133, thus providing better stability for the movement of the movable stopper 130 relative to the intermediate member 120 and limiting a displacement range of the movable stopper 130.

Specifically, in the illustrated exemplary embodiment, as shown in FIGS. 1-7, the two connecting arms 133 have different lengths in the up-down direction Y.

Figure 4:
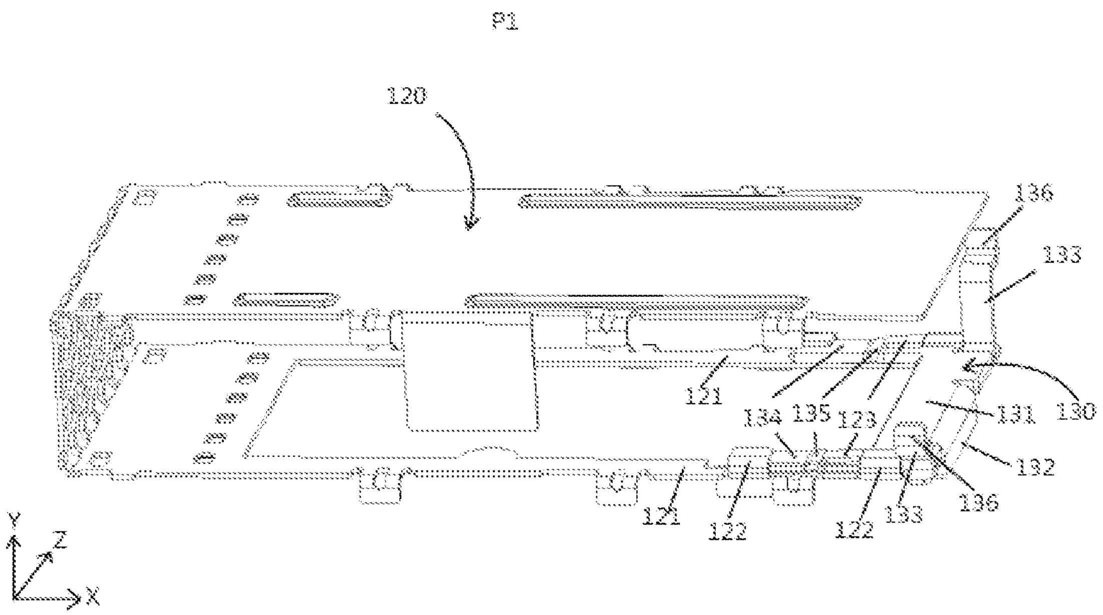
FIG. 4 is perspective view of an intermediate member and the movable stopper in the first position.
Figure 5:
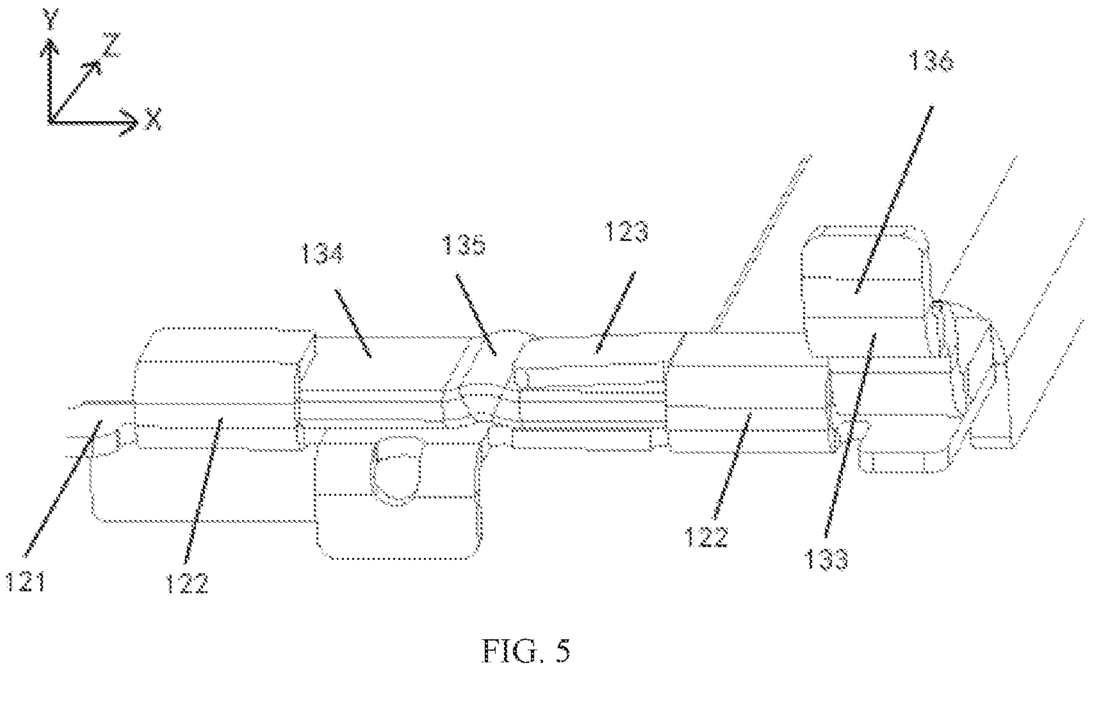
FIG. 5 is an enlarged perspective view of the intermediate member and the movable stopper of FIG. 4.
Figure 6:
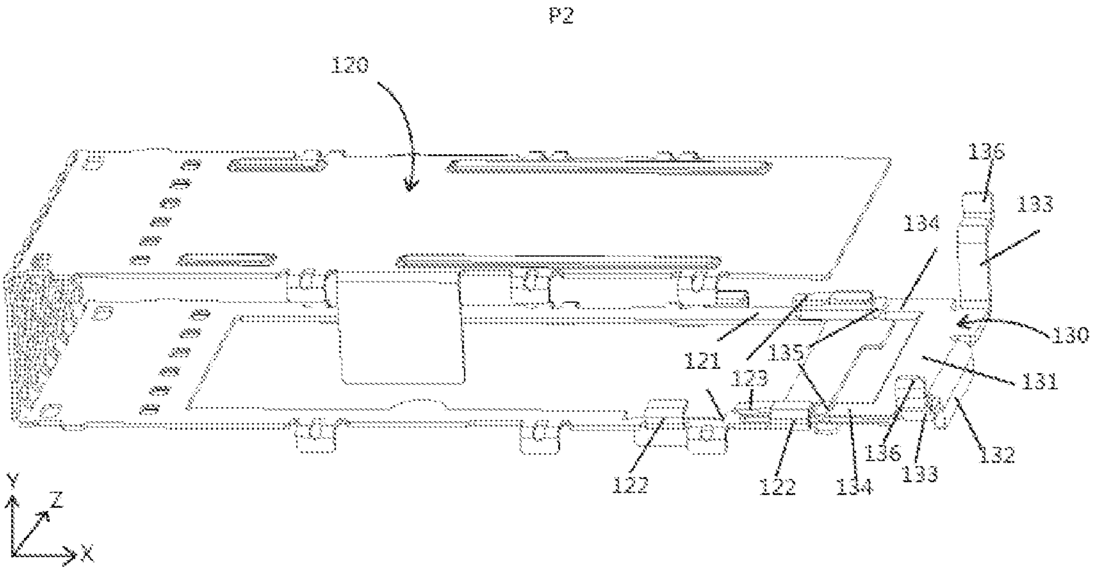
FIG. 6 is a perspective view of the intermediate member and the movable stopper in the second position.
Figure 7:
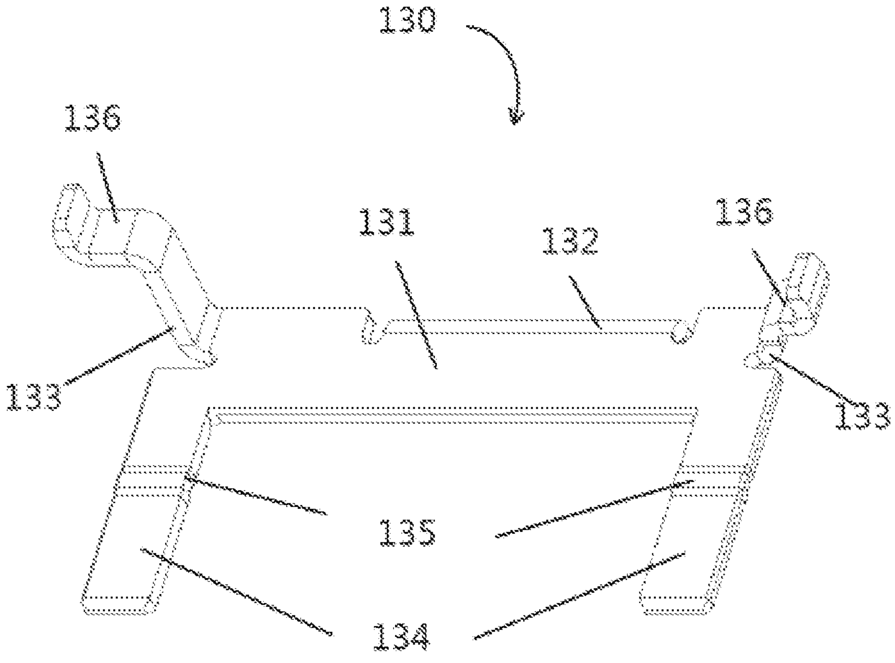
FIG. 7 is a perspective view of the movable stopper.
Figure 8:
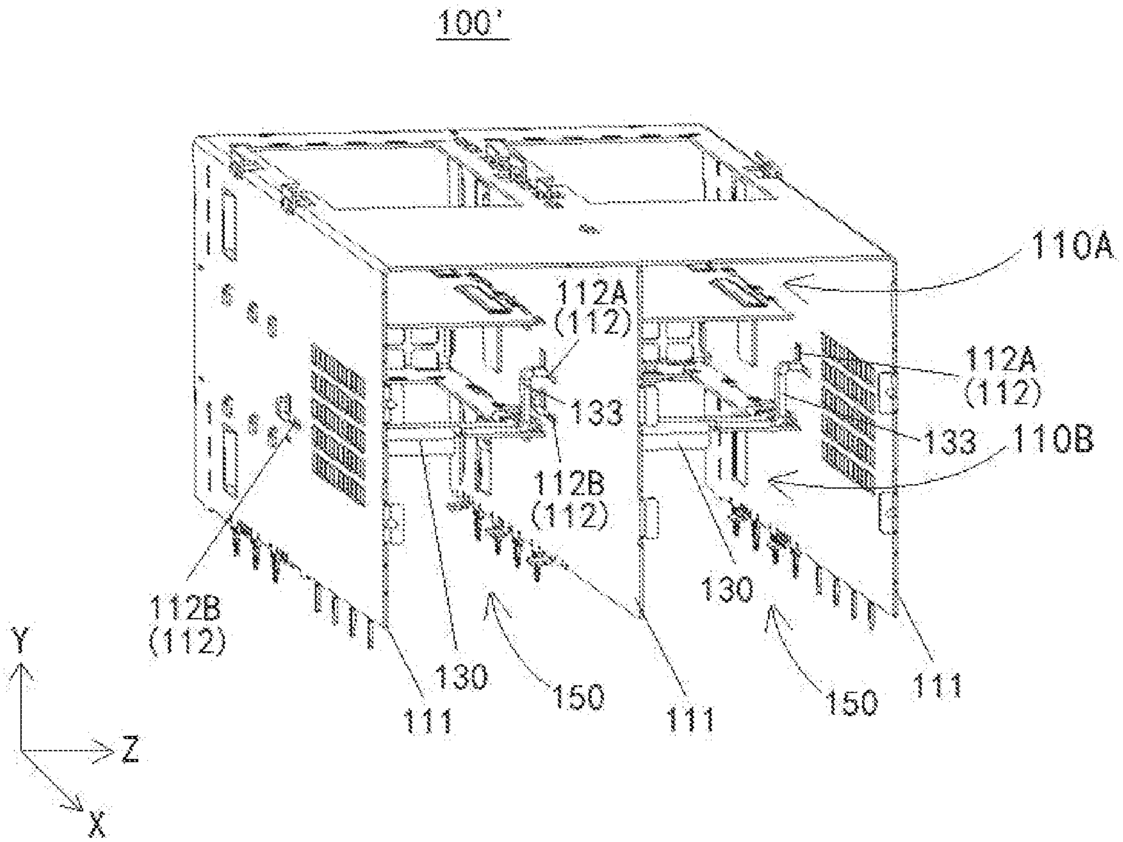
FIG. 8 is a perspective view of a connector cage assembly according to another embodiment.

According to another exemplary embodiment of the disclosure, as shown in FIG. 8, there is provided a connector cage assembly 100'. The connector cage assembly 100' includes at least two ports 150 arranged side by side in the horizontal direction. Each of the ports 150 includes: a housing 110, an intermediate member 120, and a movable stopper 130. The housing 110 defines an upper port 110A and a lower port 110B stacked from each other in the up-down direction Y. The intermediate member 120 is provided between the upper port 110A and the lower port 110B in the up-down direction Y. The movable stopper 130 is movably provided on the intermediate member 120 and can move between the first position P1 (as shown in FIG. 4) and a second position P2 (as shown in FIG. 6) in the front-rear direction X perpendicular to the up-down direction Y, wherein the movable stopper 130 is at least partially located inside the intermediate member 120 in the first position P1, and the movable stopper 130 at least partially extends beyond the intermediate member 120 and limits the plug connector 200 inserted into the lower port 110B in the second position P2.

As shown in FIG. 8, the movable stopper 130 includes two connecting arms 133. Each of the ports 150 includes two opposite side walls 111, and each of the side walls 111 is provided with a connecting groove 112. The two connecting arms 133 are slidably provided in the connecting grooves 112 in the corresponding side wall 111, respectively. A height position of the connecting grooves 112 in the two opposite side walls 111 of each port 150 is different (the "height" described herein is a length of the connecting grooves 112 in the up-down direction Y). More specifically, one side wall 111 is shared between the two adjacent ports 150, and is provided with two connecting grooves 112A and 112B with different height positions, which are used for installing one connecting arm 133 of the movable stoppers 130 inside the two adjacent ports, respectively. The specific structures of the connecting grooves 112 (112A, 112B) in the embodiment shown in FIG. 8 may be the same as the specific structures of the connecting grooves 112 in the embodiments shown in FIGS. 1 to 7, which will not be repeated herein.

For example, FIG. 8 shows a simplified schematic diagram of a connector cage assembly 100' having a plurality of ports in a horizontal direction according to another exemplary embodiment of the present disclosure, wherein a positional relationship between the movable stoppers 130 of two adjacent ports 150 of the connector cage assembly in the horizontal direction are shown. As can be seen from FIG. 8, the left connecting arm of the movable stopper 130 in the right port 150 and the right connecting arm of the movable stopper 130 in the left port 150 are assembled in the L-shaped connecting grooves 112A and 112B in the shared side wall 111 of the two adjacent port 150 of the connector cage assembly 100' with different heights, thereby avoiding interfering with each other. That is to say, it is favorable that the connecting arms of two adjacent connector cage assemblies do not interfere with each other by adopting the asymmetric design in length of the two connecting arms on the left and right sides of the movable stopper 130 when a plurality of connector cage assemblies are used in combination.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the present disclosure have been described hereinbefore in detail with reference to the accompanying drawings, it should be appreciated that the disclosed embodiments in the accompanying drawings are intended to illustrate embodiments of the present disclosure by way of example, and should not be construed as a limitation to the present disclosure.

Although some embodiments of the general inventive concept of the present disclosure have been shown and described, it would be appreciated by those skilled in the art that changes or modification may be made to these embodiments without departing from the principles and spirit of the general inventive concept, the scope of which is defined in claims and their equivalents.

It should be noted that, the word "include" or "include" doesn't exclude other elements or steps, and the word "a" or "an" doesn't exclude more than a plurality. In addition, any reference numerals in the claims should not be interpreted as the limitation to the scope of the present disclosure.

What is claimed is:

1. A connector cage assembly, comprising:

a housing defining an upper port and a lower port stacked over each other in an up- down direction;

an intermediate member between the upper port and the lower port in the up-down direction; and a movable stopper movably disposed on the intermediate member and movable between a first position and a second position in a front-rear direction perpendicular to the up-down direction, the movable stopper is at least partially located inside the intermediate member in the first position, the movable stopper at least partially extends beyond the intermediate member and limits a plug connector inserted into the lower port in the second position.

2. The connector cage assembly of claim 1, wherein the movable stopper has a base and a stopping portion extending from the base, the stopping portion is bent from the base into the lower port to stop the plug connector.

3. The connector cage assembly of claim 2, wherein the movable stopper has a sliding arm extending from an end side of the base in a left-right direction perpendicular to both the front-rear direction and the up-down direction.

4. The connector cage assembly of claim 3, wherein the intermediate member has a supporting arm, the sliding arm is slidably supported on the supporting arm.

5. The connector cage assembly of claim 4, wherein the supporting arm has a surrounding portion extending from one side of the supporting arm and bent toward another side of the supporting arm, the surrounding portion at least partially surrounds the sliding arm.

6. The connector cage assembly of claim 5, wherein the surrounding portion has a C-shaped cross section.

7. The connector cage assembly of claim 4, wherein one of the supporting arm and the sliding arm has a reinforcing rib and the other of the supporting arm and the sliding arm has an abutting elastic piece.

8. The connector cage assembly of claim 7, wherein the abutting elastic piece abuts against the reinforcing rib to prevent the sliding arm from sliding relative to the supporting arm when the movable stopper is in the first position.

9. The connector cage assembly of claim 8, wherein an abutting force between the reinforcing rib and the abutting elastic piece is less than 5N.

10. The connector cage assembly of claim 4, wherein the supporting arm is one of a pair of supporting arms of the intermediate member, the supporting arms are parallel to each other, extend in the front-rear direction, and are spaced apart from each other in the left-right direction.

11. The connector cage assembly of claim 10, wherein the sliding arm is one of a pair of sliding arms of the movable stopper, the sliding arms are parallel to each other and spaced apart from each other in the left-right direction, the sliding arms extend from a corresponding end side of the base in the left-right direction and are each slidably supported on one of the supporting arms.

12. The connector cage assembly of claim 4, wherein the movable stopper has a pair of connecting arms extending from the base in the left-right direction, each of the connecting arms is bent to extend in the up-down direction and is bent at an end to form a connecting head.

13. The connector cage assembly of claim 12, wherein the housing has a pair of connecting grooves in a pair of opposite side walls of the housing, the connecting heads of the connecting arms are slidably disposed in the connecting grooves.

14. The connector cage assembly of claim 13, wherein each of the connecting grooves is L-shaped, a short-side groove portion of each of the connecting grooves assembles one of the connecting heads into the connecting groove, a long-side groove portion of each of the connecting grooves slides one of the connecting heads therein.

15. The connector cage assembly of claim 12, wherein the connecting arms have different lengths in the up-down direction.

16. A connector cage assembly, comprising:

a pair of ports arranged side by side in a horizontal direction, each of the ports including:

a housing defining an upper port and a lower port stacked over each other in an up-down direction;

an intermediate member between the upper port and the lower port in the up-down direction; and a movable stopper movably disposed on the intermediate member and movable between a first position and a second position in a front-rear direction perpendicular to the up-down direction, the movable stopper is at least partially located inside the intermediate member in the first position, the movable stopper at least partially extends beyond the intermediate member and limits a plug connector inserted into the lower port in the second position.

17. The connector cage assembly of claim 16, wherein the movable stopper has a pair of connecting arms and each of the ports has a pair of opposite side walls, each of the side walls has a connecting groove in which one of the connecting arms is slidably disposed.

18. The connector cage assembly of claim 17, wherein a height position of the connecting grooves on the opposite side walls of each port is different.

19. The connector cage assembly of claim 17, wherein one of the side walls in each of the ports is shared between the ports.

20. The connector cage assembly of claim 19, wherein the one of the side walls has a pair of connecting grooves with different height positions and each receiving one of the connecting arms.

* * * * *